May 8, 1923.

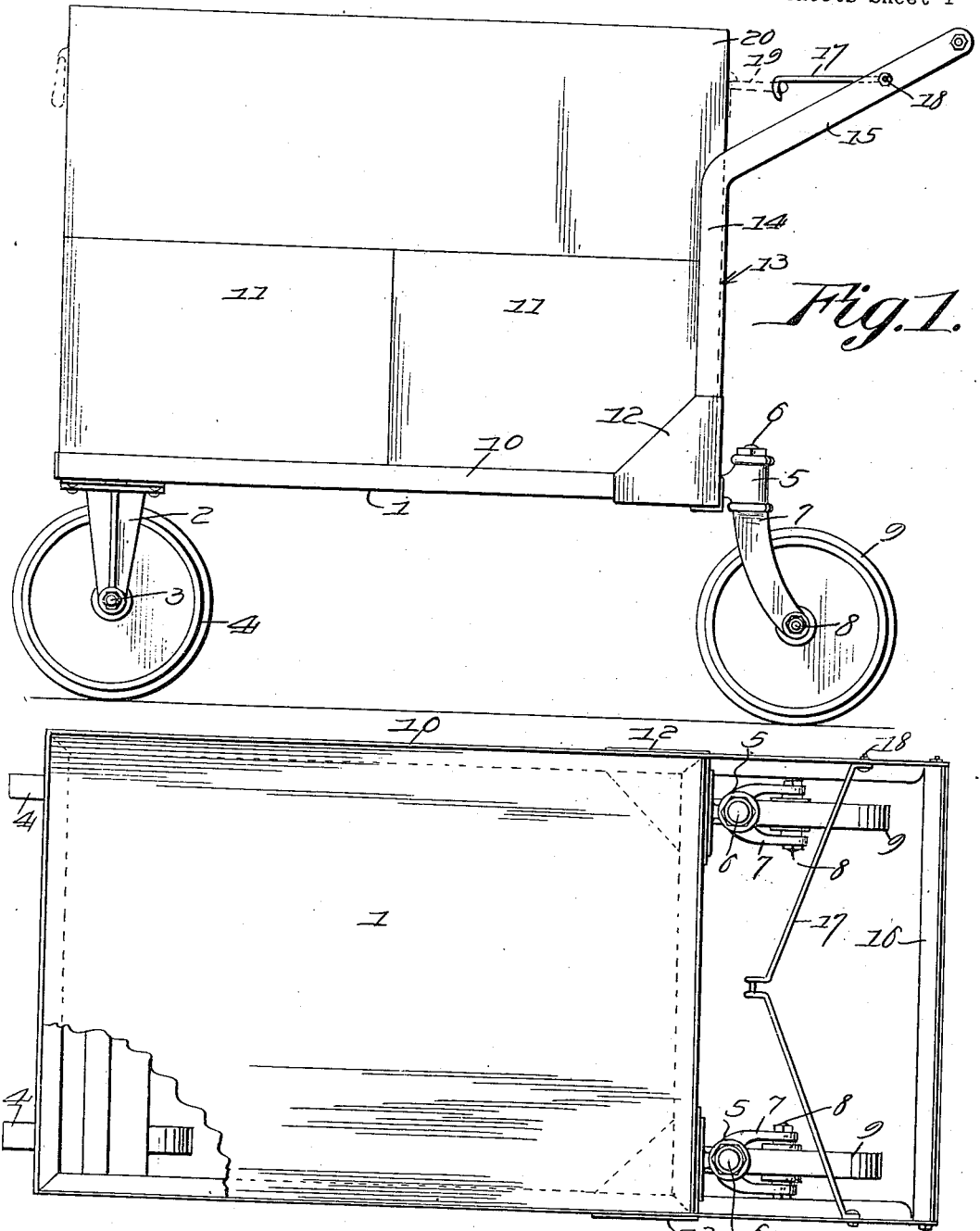

C. M. DRINKWATER

TRUCK

Filed May 2, 1921

Inventor
C. M. Drinkwater,
By William W. Deane
his Attorney

Patented May 8, 1923.

1,454,710

UNITED STATES PATENT OFFICE.

CHARLES M. DRINKWATER, OF KOKOMO, INDIANA, ASSIGNOR, BY MESNE ASSIGNMENTS, TO THE MECHANICAL DEVELOPMENT COMPANY, A CORPORATION OF DELAWARE, AND C. M. DRINKWATER, OF NEW ROCHELLE, NEW YORK.

TRUCK.

Application filed May 2, 1921. Serial No. 466,245.

*To all whom it may concern:*

Be it known that I, CHARLES M. DRINKWATER, citizen of the United States, residing at Kokomo, in the county of Howard and State of Indiana, have invented certain new and useful Improvements in Trucks, of which the following is a specification, reference being had therein to the accompanying drawing This invention relates to improvements in trucks, designed particularly for use in conveying food containers within the wards of hospitals and the like.

The primary object of the invention is to furnish a strong, durable truck of light inexpensive construction which may be readily propelled by hand.

Another object of the invention is to furnish a truck platform with means for retaining receptacles on the same, said means preferably consisting of an upwardly extending short flange which will prevent a receptacle from sliding off the platform but which will not offer any friction to the ready removal of a receptacle from the platform.

A further object of the invention is to furnish a truck having a handle provided with guide members which will aid in positioning receptacles on the platform and which will also function to prevent lateral movement of a receptacle which is engaged by the guiding means.

A still further object of the invention is to provide a truck of the above character with fastening means for holding a receptacle in place upon the truck so that the receptacle engaged by the fastening means will not shift longitudinally of the truck platform.

A still further object of the invention is to provide an auxiliary platform so constructed that it may be placed on the main platform to provide a support of a height sufficient to position a receptacle held by the platform at a height approximately equal to the height of an ordinary table top, so that food in a receptacle carried by the auxiliary platform may be readily distributed from the receptacle into dishes or the like on a table adjacent which the truck has been placed.

With the foregoing objects outlined and with other objects in view which will appear as the description proceeds the invention consists in the novel features herein-after described in detail illustrated in the accompanying drawing and more particularly pointed out in the appended claims.

Referring to the drawings:

Figure 1 is a side view of the improved truck with food receptacles mounted on the same.

Fig. 2 is a top plan view of the truck.

Figure 3:
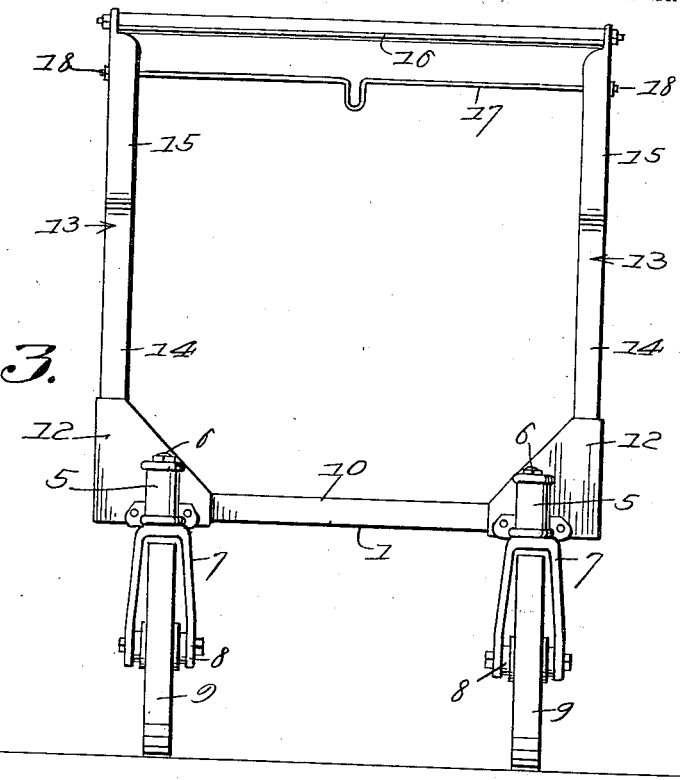
Fig. 3 is a rear end view.

In the drawing, 1 designates the main platform of the truck which is provided at its forward end with pendant brackets or ears to which are connected a front axle 3 on which is mounted supporting wheels 4. The rear portion of the platform is provided with fixed sockets 5 having vertically disposed apertures in which are swiveled trunnions 6 formed on the upper ends of forks 7 which carry axles 8 on which are mounted steering wheels 9.

The platform 1 is provided around its edge with an upwardly extending flange 10 and this flange projects upwardly only a slight distance above the platform in order to form a ledge to prevent shifting of receptacles 11 which are designed to be carried by the truck.

The rear end of the platform is provided with upwardly extending angle iron brackets 12 which reinforce the platform and also function as guides in placing a receptacle on the platform. When a receptacle is placed on the platform and pushed rearwardly these guides will facilitate positioning of the receptacle and will act to prevent them from shifting laterally or rearwardly.

Angle iron arms 13 have their lower ends connected to the platform and extend upwardly. These angle irons include vertical portions 14 and upward and rearwardly extending portions 15. These arms also act as guides to aid in positioning receptacles on the platform.

The rear upper ends of the arms 13 are connected together by a handle 16 and a hook member 17 is pivoted to the arms 13 at the joints 18. This hook member as best shown in Fig. 1 is designed to engage the handle 19 at the end of a receptacle 20 for the purpose of holding the receptacle 20 in position.

With the construction described, receptacles 11 and 20 of certain dimensions are designed to be placed on the truck and to contain vessels of heated food. The truck is then to be wheeled to the place where the food is to be dispensed and then the food may be served directly from the vessels. Where the upper receptacle 20 is placed on top of the receptacles 11 it is not necessary to provide means for raising the receptacle 20 any higher than that shown in Figure 1 as vessels contained in the upper receptacle at this time will have their mouths arranged on a plane substantially the same as the top of a dining table. Then food may be served from these vessels without causing the operator to stoop to reach the contents of the vessel. Under certain circumstances the receptacles 11 will not be used and hence it is necessary to provide auxiliary means for holding the receptacle 20 at the proper height to facilitate serving the contents of vessels carried by said receptacle.

Figure 4:
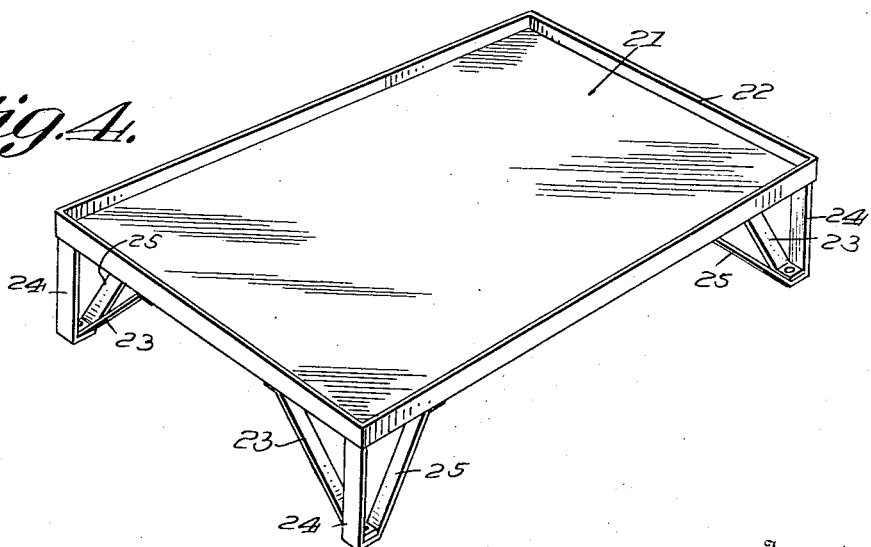
Fig. 4 is a perspective view of the auxiliary platform.

Such an auxiliary means is illustrated in Fig. 4 in which 21 designates an auxiliary platform which is provided with a border flange 22 which functions to retain a receptacle on the auxiliary platform. The auxiliary platform is provided with legs each formed of strips of metal 23, 24 and 25 and these legs are designed to rest on the platform 1 and to be retained on said platform by means of the border flange 10.

From the foregoing I believe that the construction, operation and advantages of my invention will be readily understood by those skilled in the art and I am aware that various changes may be made in the construction illustrated without departing from the spirit of the invention as expressed in the following claims.

What is claimed and desired to be secured by Letters-Patent is:

1. A truck including a platform mounted on supporting wheels and provided with a short upwardly extending border flange, and handle bars secured to the platform and forming grooves extending upwardly from said platform and arranged in alignment with the corner recesses formed by said flange at one end of the platform.

2. A truck including a platform provided with a short upwardly extending border flange, supporting wheels for said truck, upwardly extending angle irons connected to the rear corners of said platform, and provided with grooves arranged in alignment with the rear corner recesses formed by said flange, and arms extending upwardly and rearwardly from said platform and carrying a handle, said arms being provided with grooves aligned with the grooves of said angle irons.

3. A truck of the kind defined by claim 1 in which the handle bars are connected together at their upper ends by a cross rod, and a hook member designed to engage a receptacle carried by the platform, said hook member being pivotally connected to the bars below said rod.

4. A truck including a platform provided at its edges with an upwardly extending short endless border flange, pendant brackets connected to the forward end of said platform, supporting wheels connected to said brackets, rearwardly extending sockets provided at the rear end of the platform, fork members having trunnions swiveled in said sockets, steering wheels connected to said fork members, angle iron brackets secured to the rear corners of said platform and extending upwardly from the platform, angle iron arms extending vertically upward from said platform and provided with upwardly and rearwardly extending portions, a handle secured to the rearwardly extending portions of said arms, and a hook member pivotally connected to said rearwardly extending portions and designed to engage a receptacle for holding the same in position upon said platform.

5. In a truck, the combination with a main platform having an upwardly extending endless border flange, of an auxiliary platform having leg members designed to engage the flange for retaining the auxiliary platform on the main platform, angle iron brackets arranged at the rear corners of said platform and forming grooves arranged in alignment with the rear corner recesses formed by said flange, and angle iron handle bars extending vertically from the rear corners of said platform and having their upper ends directed rearwardly and inclined, and a handle rod connecting said bars, said bars having vertical grooves aligned with the grooves of said brackets.

In testimony whereof I hereunto affix my signature in the presence of two witnesses.

CHARLES M. DRINKWATER.

Witnesses:
GEO. W. CHASE,
MARVEN THOMPSON.